United States Patent [19]

Fancy

[11] 4,129,320
[45] Dec. 12, 1978

[54] SEAT BELT SECURING DEVICE
[75] Inventor: Richard E. Fancy, Rochester, Mich.
[73] Assignee: General Motors Corporation, Detroit, Mich.
[21] Appl. No.: 826,642
[22] Filed: Aug. 22, 1977
[51] Int. Cl.² ............................................. B60R 21/10
[52] U.S. Cl. .................................... 280/744; 280/747; 24/241 P
[58] Field of Search .............. 280/744, 747; 24/241 P, 24/241 PP, 241 PS

[56] References Cited
U.S. PATENT DOCUMENTS

| 3,698,048 | 10/1972 | Weman | 24/241 P |
| 3,844,001 | 10/1974 | Holmberg | 280/744 |
| 3,920,265 | 11/1975 | Nilsson | 280/744 |

Primary Examiner—Robert R. Song
Attorney, Agent, or Firm—Charles E. Leahy

[57] ABSTRACT

A seat belt securing device includes a C-shaped hook member which has upper and lower legs spaced apart to define a belt receiving slot having a forwardly facing open end. A pivot is provided between the lower leg and a vehicle body mounted bracket to permit pivotal movement of the hook member between an open belt receiving position, a forwardly pivoted belt capturing position and a rearwardly pivoted belt releasing position. A spring acts between the bracket and the hook member and goes overcenter between a compressed condition biasing the hook member to a belt capturing position and a relaxed condition maintaining the hook member in the open belt receiving position. The spring is yieldable from the relaxed condition to a tensioned condition upon rearward pivotal movement of the hook member from the open position to the belt releasing position.

3 Claims, 5 Drawing Figures

U.S. Patent  Dec. 12, 1978  4,129,320
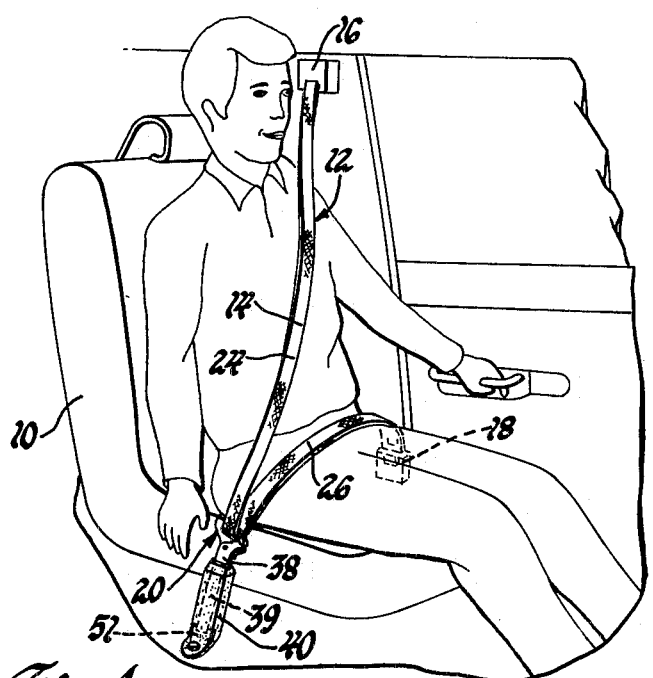
Fig.1
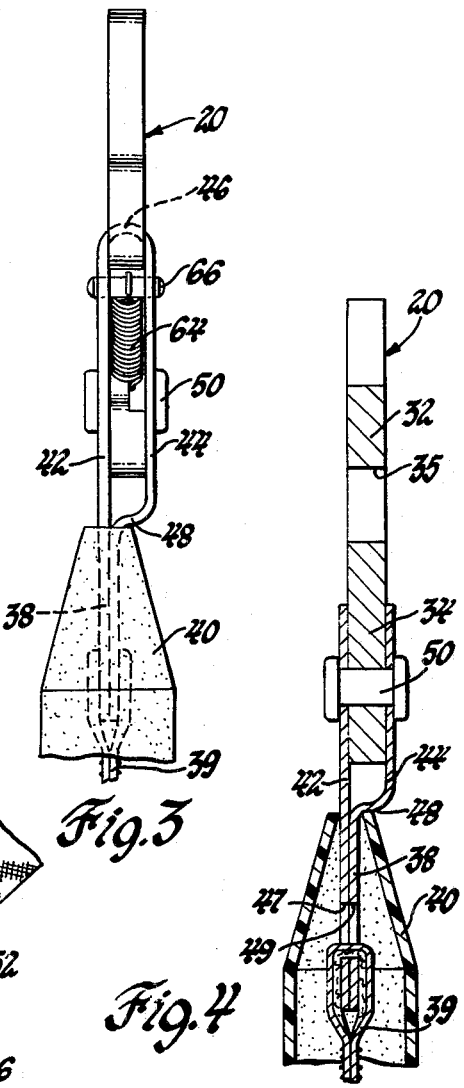
Fig.3
Fig.4
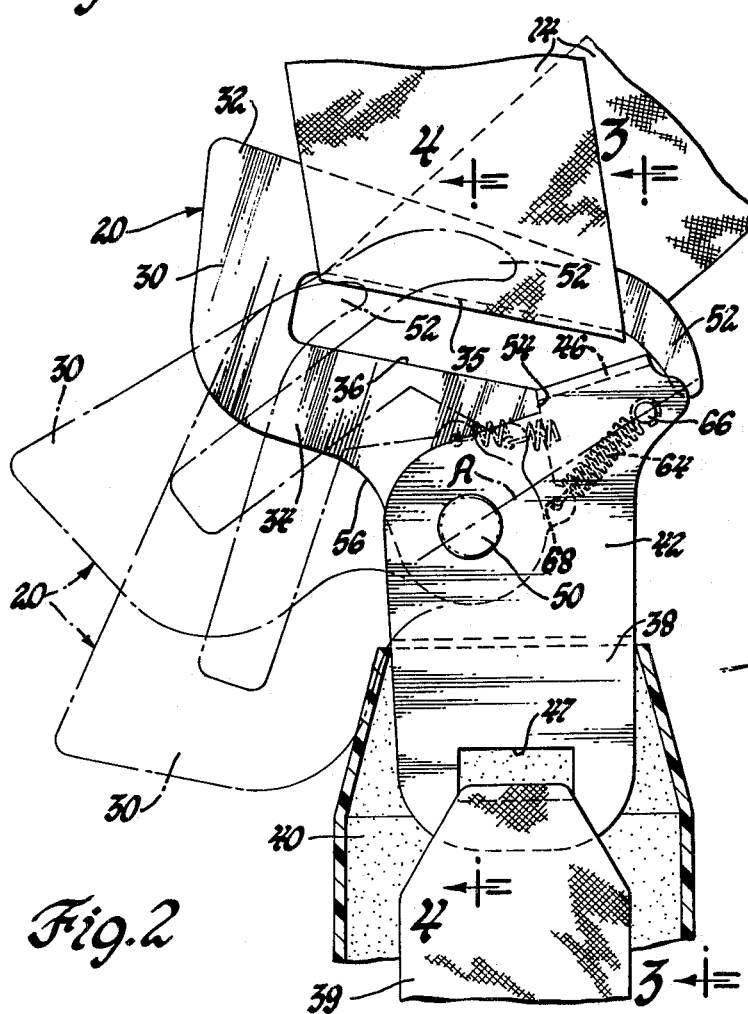
Fig.2
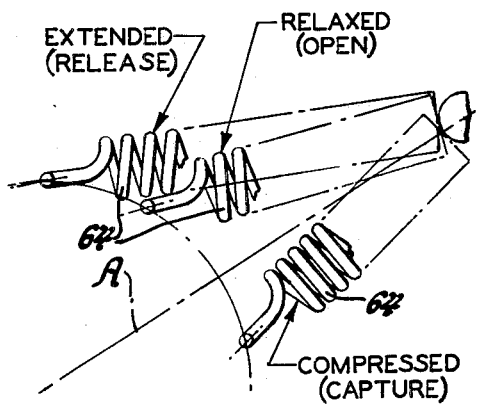
Fig.5

SEAT BELT SECURING DEVICE

The invention relates generally to a seat belt system and more particularly to a securing device for releasably securing a belt in an occupant restraining position.

Occupant restraint systems for motor vehicles commonly employ a shoulder belt which extends over the shoulder and across the chest of the occupnnt as well as a lap belt which extends across the lap of the seated occupant. One type of well-known seat belt system is a three-point belt system comprising a single length of belt having its lower end mounted to the vehicle floor outboard the occupant seating position and its upper end attached to the vehicle body by an inertia responsive seat belt retractor. The device for securing the belt in an occupant restraining position is mounted inboard the occupant seating position.

One such seat belt securing device is the subject of U.S. Ser. No. 822,663, filed Aug. 8, 1977, which is a Continuation-in-Part of Ser. No. 727,290 which was filed Sept. 27, 1976 and is assigned to the assignee of this invention. That securing device includes a C-shaped hook member having upper and lower legs spaced apart to define a belt receiving slot having a forwardly open end. The lower leg of the hook member is pivotally mounted on a mounting bracket adjacent the hip of the seated occupant for pivotal movement about an axis extending transversely of the vehicle body. A spring urges the hook member to a downwardly directed belt capturing position and is yieldable to permit the occupant to pivot the hook member to an upwardly directed position to release the belt from the hook member for movement to the stored position by a belt retractor. The relationship between a pivotal mount and the hook member is such that force applied to the hook member by the belt during restraint of the occupant acts in a direction to retain the hook member in its downwardly directed position to assure capture of the belt in the restraining position.

The present invention provides an improvement in and alternative to the aforedescribed seat belt securing device.

According to the present invention a C-shaped hook member has upper and lower legs spaced apart to define a belt receiving slot having a forwardly facing open end. A pivot is provided between the lower leg and a vehicle body mounted bracket. A spring acts between the bracket and the hook member and goes overcenter between a compressed condition biasing the hook member to a belt capturing position and a relaxed condition maintaining the hook member in a belt receiving position. The spring is further yieldable from the relaxed condition to a tensioned condition upon further pivotal movement of the hook member beyond the open position to a belt releasing position.

One feature, object and advantage of the invention is the provision of a C-shaped hook member for securing a seat belt and having an associated spring for selectively and alternately positioning the hook member in a belt capturing position and an open belt receiving position.

Another feature, object and advantage of the invention is the provision of a pivotally mounted hook member and an associated spring which biases the hook member to either a belt capturing position or an open belt receiving position and is yieldable to permit pivotal movement beyond the open belt receiving position to a belt releasing position.

These and other features, objects and advantages of the invention will become apparent upon consideration of the specification and the appended drawings in which:

FIG. 1 shows the belt system in the occupant restraining position by engagement with the securing device;

FIG. 2 is a side elevation view of a seat belt securing device wherein the belt capturing position is shown in solid lines and the open belt receiving position and the belt releasing position are shown in phantom line;

FIG. 3 is a view taken in the direction of arrows 3—3 of FIG. 2;

FIG. 4 is a sectional view taken in the direction of arrows 4—4 of FIG. 2; and

FIG. 5 shows the position of the overcenter bias spring in its various operating conditions.

Referring to FIG. 1, there is shown a motor vehicle occupant compartment wherein a vehicle seat 10 is conventionally arranged. A seat belt system, generally indicated at 12, is provided for restraining the occupant in the seated position.

The seat belt system 12 includes a single length of seat belt 14 which has its upper end attached to the vehicle body by an inertia responsive retractor 16 and its lower end conventionally attached to the vehicle body floor pan or body sill by an anchor bracket 18. A securing device, generally indicated at 20, is attached to the vehicle body inboard the seat 10. The securing device 20 engages the belt 14 in occupant restraining position of FIG. 1 wherein the belt is divided into a shoulder belt portion 24 diagonally positioned across the chest of the occupant and a lap belt portion 26 which crosses the lap of the occupant.

Referring to FIG. 2, the securing device 20 includes a hook member 30 having an upper leg 32 and a lower leg 34 which are spaced apart to define a belt receiving slot 36 which opens in the forward direction. The belt receiving slot 36 is defined in part by a lower face 35 which is engageable by the belt 14 as will be discussed hereinafter. As best seen in FIGS. 3 and 4, the mounting bracket 38 is a sheet metal stamping having upright walls 42 and 44. The upper ends of walls 42 and 44 are spaced apart in parallel relation by a connecting curved wall 46 and a lateral offset 48 in wall 44 to define a space for receiving the lower leg 34 of hook member 30. As best seen in FIG. 4, a rivet 50 extends through aligned apertures of the bracket walls 42 and 44 and the hook member lower leg 34 to mount the hook member 34 for forward and rearward pivotal movement between the various positions depicted in FIG. 2.

The mounting bracket 38 is connected to the vehicle floor and resiliently supported by a strap 39 and a plastic stiffening boot 40. The walls 42 and 44 of the mounting bracket 38 have aligned apertues 47 and 49 which receive the upper end of strap 39. The lower end of strap 39 is conventionally anchored on the vehicle floor pan by an anchor plate 51. The plastic stiffening boot 40 surrounds the strap 39 and extends between the lateral offset 48 as best seen in FIGS. 3 and 4 and the anchor plate 51 to resiliently and yieldably support the mounting bracket 38 adjacent the hip of the seated occupant.

Referring to FIG. 2, forward pivoting motion of the hook member 30 is stopped at the solid line indicated belt capturing position by engagement of a downwardly curved lip 52 of the upper leg 32 with one edge of the mounting bracket curved wall 46 and by engagement of an abutment surface 54 of the lower leg 34 with the other end of mounting bracket curved wall 46. Pivoting of the hook member 30 to its forward position causes the belt slot 36 to be oriented in a downwardly extending direction. Furthermore, the end of the slot 36 is closed by engagement of the upper and lower legs with the mounting bracket curved wall 46 so that the belt is captured within the slot as will be described more fully hereinafter.

Referring again to FIG. 2, rearward pivoting motion of the hook member 30 is stopped by engagement of an underside 56 of the lower leg 34 with the lateral offset 48 in the mounting bracket wall 44. Pivoting of the hook 30 to this extreme rearward pivotal position results in a generally upwardly extending orientation of the slot 36 and upper leg 32 which permit the windup spring of the retractor 16 to disengage the belt 14 from the securing device 20.

Referring now to FIGS. 2 and 5, it is seen that a coil spring 64 acts between a mounting pin 66 on the mounting bracket 38 and a hole 68 in the lower leg 34. The spring 64, as best seen in FIG. 3, is enclosed between the spaced apart walls 42 and 44 of the mounting bracket 38. As seen in FIG. 2, the spring 64 is arranged to go overcenter with respect to a line designated "A" which is drawn between the rivet 50 of the hook member 30 and the mounting pin 66. Furthermore, the spring 64 is designed for both compression and extension from its relaxed or unstressed condition.

Referring to FIG. 5, the various operating conditions of the spring 64 are shown. Pivoting of the hook member 30 induces movement of the spring 64 between its extended condition, its relaxed condition and its compressed condition. The relaxed condition of the spring poises the hook member 30 in the phantom line indicated open belt receiving position of FIG. 2 wherein the upper and lower legs of the hook member are poised away from engagement with the mounting bracket curved wall 46 so that the slot 36 is open to receive the belt.

Clockwise forward pivoting movement of the hook member 30 causes the spring to be compressed and then go overcenter until stopped by engagement of the hook member with the mounting bracket curved wall 46 wherein the spring remains in a partially compressed state to provide a continuous biasing effort which maintains the hook member in engagement of the mounting bracket curved wall 46.

Counterclockwise rearward pivoting movement of the hook member 30 will return the spring 64 from the overcenter compressed condition to the relaxed condition. Further pivoting movement of the hook member extends the spring 64 and stores energy therein sufficient to effect a later forward return of the hook member to relax the spring.

Operation

Referring again to FIG. 1, it will be understood that prior to entry of the occupant into the vehicle, the retractor 16 will have wound the belt 14 to a stored position wherein the belt extends vertically adjacent the wall of the passenger compartment between the retractor 16 and anchor bracket 18. When the occupant enters the passenger compartment and assumes the seated position, the occupant may move the belt 14 to its restraining position of FIG. 1 by hooking his right-hand thumb under the belt and unwinding the belt from the retractor 16. The hook member 30 is poised in its phantom line indicated open belt receiving position by the relaxed spring 64 so that the belt may be inserted into the slot 36 and engaged over the upper leg 32 of the hook member 30. After the belt enters the slot 36, a slight force applied to the belt 14 or hook member 30 by the occupant or by the retractor windup spring rotates the hook member 30 in the clockwise direction to the solid line indicated belt capturing position wherein the open end of the belt slot 36 is closed by the mounting bracket curved wall 46. This forward pivoting of the hook member causes spring 64 to go overcenter to a compressed state wherein the spring effort acts to maintain hook member 30 in engagement with bracket curved wall 46. It will be understood that the belt capturing position of the hook member results in the upper leg 32 being somewhat downwardly directed and that the rivet 50 is located with respect to the belt slot 36 and lower face 35 of upper leg 32 so that force applied on the hook member 30 by the belt 14 may not by itself pivot the hook member 30 in the counterclockwise direction. A force applied to the belt during restraint of the occupant will cause a clockwise movement of the hook member as permitted by yielding of the strap 39 and stiffening boot 40 to cooperate with the force of spring 64 in maintaining the hook member 30 in the downward direction to assure capture of the belt.

When the occupant desires to alight from the vehicle, the hook member 30 is gripped and rotated counterclockwise to the rearward most phantom line indicated belt releasing position wherein the upper leg 32 is oriented upwardly to allow the belt 14 to slip off the upper leg 32 out of the slot 36 for windup by the retractor 16. Release of this rearward biasing effort by the occupant allows the spring 64 to return to its relaxed condition and thereby pivot hook member 30 in the clockwise direction to its open belt receiving position where it remains poised for subsequent engagement by the belt.

Accordingly, it is seen that the invention provides a C-shaped hook member which is selectively and alternately biased between its various operative conditions by an overcenter spring.

The embodiments of the invention in which an exclusive property or privilege is claimed are defined as follows:

1. In combination with a vehicle body adapted to support a seated occupant, a seat belt system having a belt and a securing device for releasably capturing the belt in a restraining position about the seated occupant, said securing device comprising: a mounting bracket mounted on the vehicle body; a C-shaped hook member having upper and lower legs spaced apart to define a belt receiving slot having a forward facing open end; pivot means acting between the mounting bracket and the hook member to mount the hook member for pivotal movement about an axis extending transversely of the vehicle body and between a belt capturing position wherein the legs and the slot extend in a downwardly direction and an open position wherein the legs and the slot extend in an upwardly direction to receive and release the belt; and spring means acting between the mounting bracket and the hook member and going overcenter upon movement of the hook member between the belt capturing position and the open position to selectively and alternately bias the hook member to the selected position.

2. The combination with a vehicle body adapted to support a seated occupant, a seat belt system having a belt and a securing device for releasably capturing the belt in a restraining position about the seated occupant, said securing device comprising: a mounting bracket mounted on the vehicle body adjacent the hip of the seated occupant; a C-shaped hook member having upper and lower legs spaced apart to define a belt receiving slot having a forwardly facing open end; pivot means acting between the mounting bracket and the lower leg; and spring means acting between the mounting bracket and the hook member, said spring means having a first operative condition wherein the spring is under compression to maintain the hook member in engagement of the mounting bracket to define a belt capturing position, said spring means moving overcenter upon pivotal movement from the belt capturing position and being extended to a tensioned condition as the hook member is manually pivoted rearwardly to release the belt from the hook member for movement from the restraining position, the tension of the spring means returning the hook member in an open position intermediate the belt capturing position and the belt releasing position wherein the spring attains a neutral unstressed condition and poises the hook member in an open position for subsequent entry of the belt within the belt receiving slot.

3. In a vehicle body seat belt system having a belt and a securing device for releasably and slidably capturing the belt in a restraining position about the occupant, said securing device comprising: a C-shaped hook member having upper and lower legs spaced apart to define a belt receiving slot having an open end; a mounting bracket mounted on a vehicle body; pivot means acting between the mounting bracket and the lower leg to mount the hook member adjacent the hip of the seated occupant for pivotal movement about an axis extending generally transversely of the vehicle body and between a belt capturing position wherein the legs and the slot extend in a downwardly and forwardly direction, and a belt releasing position wherein the legs and the slot extend in an upwardly and forwardly direction; spring means acting between the mounting bracket and the hook member so that the spring means is in a compressed overcenter condition when the hook member is in the belt capturing position to retain the hook member in the belt capturing position, said spring means moving overcenter upon pivotal movement from the belt capturing position and being extended to a tensioned condition when the hook member is moved to the belt releasing position, the tension of the spring means returning the hook member to a neutral position intermediate the belt capturing position and belt releasing position wherein the slot is open for subsequent receipt of the released belt.

* * * * *